(12) United States Patent
Scommegna et al.

(10) Patent No.: US 11,273,012 B2
(45) Date of Patent: Mar. 15, 2022

(54) SELF-ACTIVATED ORTHODONTIC EXPANDER

(71) Applicant: LEONE S.P.A., Sesto Fiorentino (IT)

(72) Inventors: Gabriele Scommegna, Tavernuzze Impruneta (IT); Maurizio Dolfi, Florence (IT)

(73) Assignee: LEONE S.P.A., Sesto Fiorentino (IT)

( * ) Notice: Subject to any disclaimer, the term of this patent is extended or adjusted under 35 U.S.C. 154(b) by 112 days.

(21) Appl. No.: 16/644,252

(22) PCT Filed: Nov. 19, 2018

(86) PCT No.: PCT/IT2018/050223
§ 371 (c)(1),
(2) Date: Mar. 4, 2020

(87) PCT Pub. No.: WO2019/102507
PCT Pub. Date: May 31, 2019

(65) Prior Publication Data
US 2020/0345458 A1    Nov. 5, 2020

(30) Foreign Application Priority Data
Nov. 27, 2017    (IT) ........................ 102017000135631

(51) Int. Cl.
*A61C 7/10*    (2006.01)
*A61C 7/30*    (2006.01)

(52) U.S. Cl.
CPC ................ *A61C 7/10* (2013.01); *A61C 7/303* (2013.01)

(58) Field of Classification Search
CPC .. A61C 7/10; A61C 7/303; A61C 7/00; A61C 7/08
See application file for complete search history.

(56) References Cited

U.S. PATENT DOCUMENTS 5,167,500 A     12/1992  Miura
5,405,614 A  *  4/1995   D'Angelo ............ A61K 9/7023
                                                    424/447

(Continued)

FOREIGN PATENT DOCUMENTS

WO        2014/122680 A1    8/2014

OTHER PUBLICATIONS

Translation of International Search Report and Written Opinion of the International Search Authority issued on Feb. 27, 2019 in corresponding International application No. PCT/IT2018/050223; 10 pages.

*Primary Examiner* — Yogesh P Patel
*Assistant Examiner* — Courtney N Huynh
(74) *Attorney, Agent, or Firm* — Maier & Maier, PLLC

(57) ABSTRACT

Self-activated orthodontic expander including a left frame and a right frame, where the left frame and right frame include, respectively, a left body and a right body, each having anchoring means for anchoring them to the teeth of a dental arch. The bodies have through holes oriented in a predetermined expansion direction, where the frames are slidably mounted along the expansion direction by guides inserted into the holes of the bodies. Elastic elements are arranged and acting between the frames. The guides are further constrained with each other by a bridge oriented orthogonally to the same guides and adapted to prevent the reciprocal movement of the guides.

9 Claims, 3 Drawing Sheets

(56) References Cited

U.S. PATENT DOCUMENTS

| | | | | |
|---|---|---|---|---|
| 5,769,631 | A * | 6/1998 | Williams | A61C 7/10 |
| | | | | 433/7 |
| 5,919,042 | A | 7/1999 | Williams | |
| 6,220,856 | B1 * | 4/2001 | Carano | A61C 7/10 |
| | | | | 433/7 |
| 7,156,654 | B2 * | 1/2007 | Inman | A61C 7/00 |
| | | | | 433/21 |
| 2003/0194675 | A1 * | 10/2003 | Williams | A61C 7/10 |
| | | | | 433/18 |
| 2004/0013996 | A1 * | 1/2004 | Sapian | A61C 7/10 |
| | | | | 433/18 |
| 2005/0221249 | A1 * | 10/2005 | Keles | A61C 7/00 |
| | | | | 433/18 |
| 2008/0003535 | A1 * | 1/2008 | Williams | A61C 7/10 |
| | | | | 433/7 |
| 2008/0171300 | A1 | 7/2008 | Forster | |
| 2010/0112507 | A1 | 5/2010 | Ehrenberger | |
| 2010/0261130 | A1 * | 10/2010 | Williams | A61C 7/10 |
| | | | | 433/7 |
| 2013/0252195 | A1 * | 9/2013 | Popat | A61C 7/10 |
| | | | | 433/24 |
| 2016/0008098 | A1 * | 1/2016 | Dolfi | A61C 7/10 |
| | | | | 433/7 |
| 2017/0290643 | A1 * | 10/2017 | Giardino | A61C 7/10 |

* cited by examiner

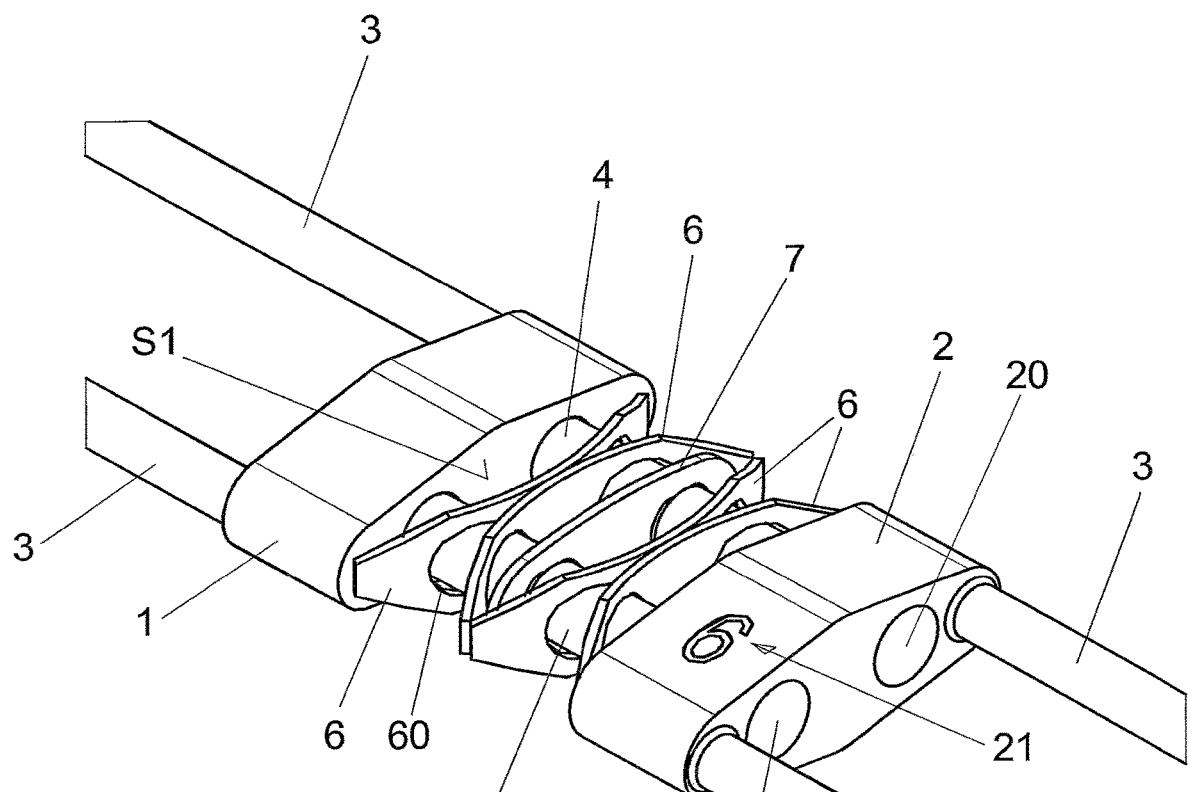
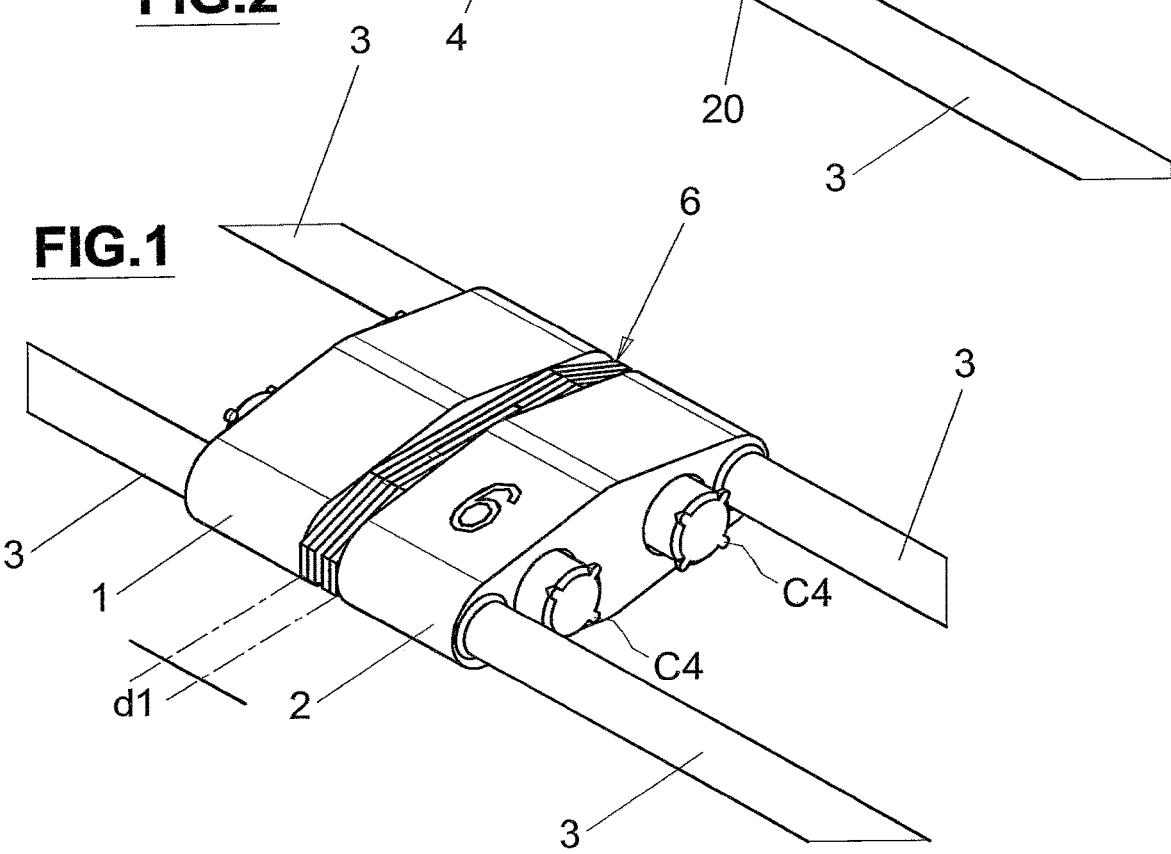

SELF-ACTIVATED ORTHODONTIC EXPANDER

FIELD

The present invention relates to a self-activated orthodontic expander, in particular e spring loaded type.

BACKGROUND

It is known that an orthodontic expander is an intraoral device used for correcting the negative effects of transverse maxillary growth deficiency by the application of forces destined to increase the width of the dental arch in the transverse direction.

In general terms, an orthodontic expander consists of two bodies, respectively connected to dental elements of the right side and the left side of the dental arch by means of anchoring arms that are connected to each other by a central screw. Between said two bodies is placed a coil spring which is compressed or "loaded" by the dentist through the central screw each time that the coil spring action is exhausted. The thrust exerted by the spring on the two bodies of the device is transmitted to the two corresponding sides of the dental arch thus determining, in a relatively long time and with the periodic loading of the spring, the desired expansion. Said spring is oriented parallel to the expansion direction, i.e. orthogonally to the two bodies that are connected to the teeth of the dental arch.

In the expanders of the type described above it is necessary to reactivate the springs periodically, acting on the central screw. This operation is usually entrusted to the relatives of the person who uses the expander, given the relative simplicity of the operation itself. However, it may happen that the expander is not operated according to die indications given by the doctor, so the corrective action that the expander can perform may be compromised.

It is still felt the need of having an orthodontic expander which does not require a periodic reactivation of the elastic means during use and which, at the same time, ensures an almost complete correspondence of the action exerted by the expander to the prescriptions of the doctor and that is of simple and reliable manufacture.

SUMMARY

The present invention aims provide a device that satisfies the aforementioned requirements.

This result has been achieved, in accordance with the present invention, by adopting the idea of realizing an orthodontic expander having the features indicated in claim 1. Other features of the present invention are indicated in the dependent claims.

Thanks to the present invention, it is possible to provide a more efficient orthodontic expander, in which the doctor has the possibility to visually check the compression state of the spring, in which the action of the spring is automatically exhausted upon reaching the desired expansion, and in which the structural configuration of the expander itself has high stability characteristics. Furthermore, the manufacturing cost of the expander is relatively small compared to the advantages offered.

BRIEF DESCRIPTION OF THE DRAWINGS

These and further advantages and characteristics of the present invention will be better understood by any person skilled in the art, thanks to the following description and to the attached drawings, provided as an example but not to be considered in a limitative sense, in which:

FIG. 1 represents a top perspective view of an orthodontic expander according to the present invention in a compressed initial configuration;

FIG. 2 represents a top perspective view of the orthodontic expander of FIG. 1 in a final configuration of maximum expansion;

DETAILED DESCRIPTION

Figure 3:
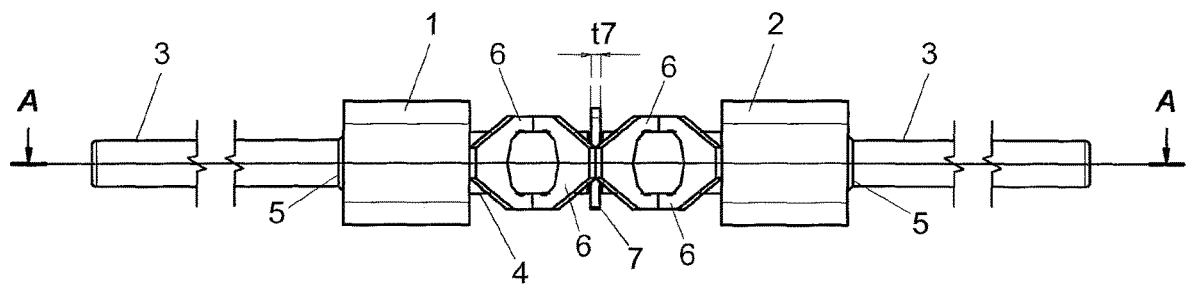
FIG. 3 represents a side view of the expander in the configuration of FIG. 2.
Figure 4:
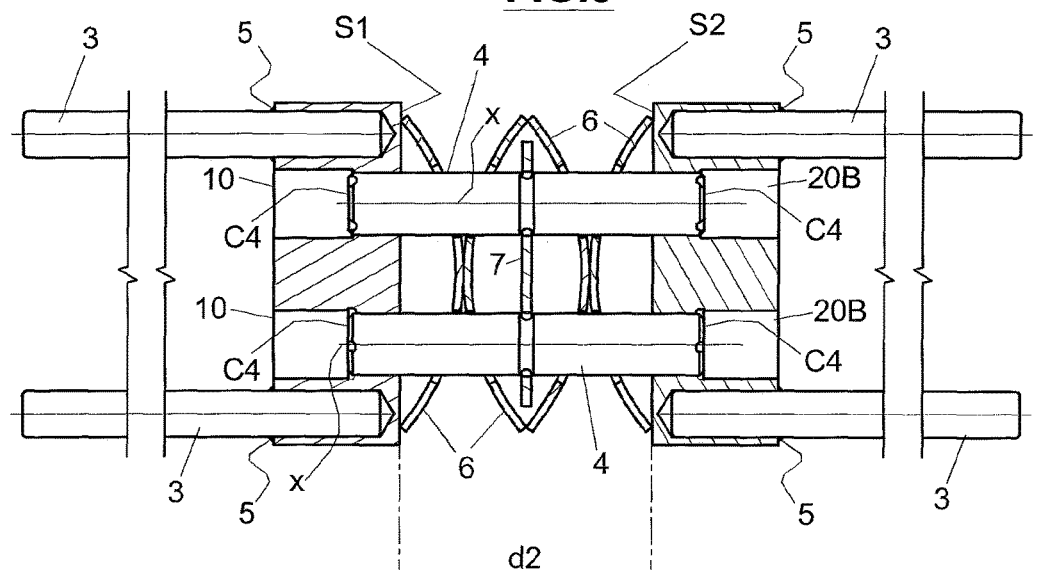
FIG. 4 shows a sectional view along line A-A of FIG. 3.

Reduced to its essential elements and with reference to the figures of the accompanying drawings, a spring loaded self-activated expander according to the present invention has two bodies, a left body (1) and a right body (2), each of which is connected to two annular bands (not shown in the attached drawings) through a corresponding pair of connection arms (3).

The two annular bands connected to each body (1, 2) can be joined together by a transverse arm according to a configuration known per se. In practice, each left (1) or right (2) body forms a left frame and respectively a right frame with the corresponding arms (3), the annular bands and the possible transverse arms. The two frames can be made, for example, in stainless steel. The left and right frames are respectively attached to the left and right sides of a patient's upper dental arch by fitting and then cementing each of the corresponding annular bands on one of the selected teeth of the same dental arch. To this end, each annular hand has a size and shape established according to the shape of the tooth on which it must be inserted. Each frame has a predetermined size and shape according to the anatomical shape of the left or right side of the side of the palate in which it is to be placed.

After fixing the bands to the selected teeth of the upper arch, each body (1, 2) becomes fixed, by the corresponding pair of arms (3), to a corresponding left or right side of the upper dental arch.

The left and right frames are connected to each other by a pair of rods or guides (4), parallel to each other, having a circular cross-section. Each rod (4) has a predetermined length, is inserted in a respective hole (10) of the left body (1) and passes through a homologous hole (20) of the right body (2), so that the two bodies (1, 2) are slidably mounted on the guides (4). The axes of the holes (10, 20) of the bodies (1, 2) are therefore oriented along the sliding direction of the latter.

Figure 5:
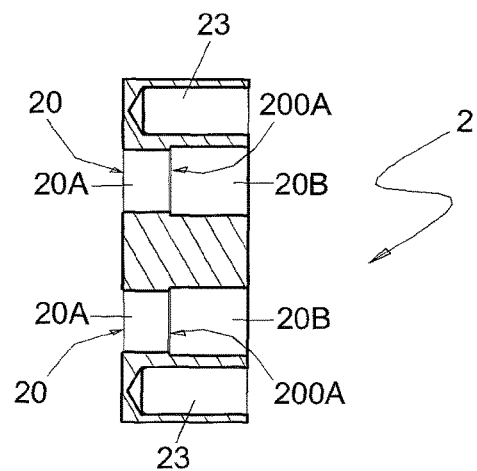
FIG. 5 shows a longitudinal section view of an expander body shown in the previous figures.
Figure 6:
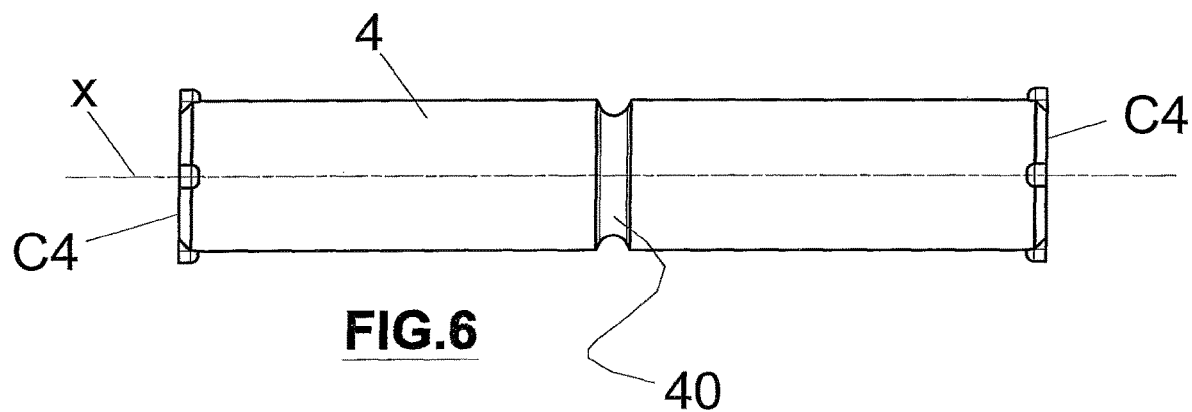
FIG. 6 represents a side view of a guide.

The two ends of each guide (4) are chamfered in such a way as to produce, on both ends of each guide (4), a diametrical enlargement which limits the sliding of the bodies (1, 2) on the guides as further described below. In the drawings said end chamfers are marked by the reference "C4". As shown in FIG. 5, which shows only the body (2) that is reproduced in longitudinal section, each hole (20) is in two sections (20A, 20B), with the internal section (20A) having a smaller diameter than the external section (20B).

The internal section (20A) of the hole (20) is that directed towards the inside of the expander, while the external section (20B) faces outwards. The sliding of the body (2) on the guides (4) is limited by the mechanic stop given to the chamfered parts (C4) when they contact the outer edge (200A) of the internal section (20A) of the holes (20). FIG. 5 also shows the seats (23) in which the corresponding ends of the arms (3) associated with the body (2) are installed. The arms (3) can be fixed to the body (2) by welding (5). The body (1) has the same structure as the body (2).

Said bodies (1, 2) have counterfeited surfaces (S1, S2) whose reciprocal distance varies according to the instantaneous position of the bodies (1, 2). In particular, this distance is comprised between a minimum value (d1) and a maximum value (d2) corresponding respectively to the initial and final configurations of the expander as further described below.

Between the counterfeited surfaces (S1, S2) of the two bodies (1, 2) deformable elastic means of predetermined stiffness are positioned along the direction of the guides (4). In other words, said elastic means exert their action on the bodies (1, 2) along the direction of the guides (4).

According to the example shown the accompanying drawings, said elastic means consist of several plates (6) with an arcuate profile. For example, the said plates are four and form two pairs, one right pair and one left pair. Each plate (6) has a pair of elliptical holes (60) through which they are fitted on the guides (4). The holes (60) being elliptical shaped rather than circular shaped allow each plate (6) to deform freely along the direction of the guides (4) without interfering with the latter.

Said plates (6) can be made, for example, in nickel-titanium.

The plates (6), when compressed, exert an expansive force on the left body (1) and an expansive force of equal intensity and opposite directed on the right body (2), both along the direction of the guides (4). Correspondingly, the left and right frames of the expander apply the expansive forces respectively on the left and right sides of the dental arch subjected to treatment.

The expansion is limited by the length of the guides (4), i.e. by the respective end chamfers (C4) as previously described.

In practice, the presence of the elastic means (6) determines the absence of the central screw normally provided in the non-self-activating expanders. The elastic means (6) therefore allow to provide an expander in which the thrust necessary for the orthodontic treatment is not provided by a screw having a maneuvering portion for adjusting the thrust exerted by the expander.

Advantageously, said guides (4) are joined together by a bridge (7) arranged perpendicular to the guides.

Preferably, the bridge (7) is placed in a central position between the guides (4), or in a central position with respect to the plates (6).

For example, the bridge (7) consists of a metal sheet with an upper side (7U) and a lower side (7L), in which the lower side (7U) has two openings (70), each of which allows to fit the bridge (7) with elastic forcing on an annular groove (40) presented by a respective guide (4) in a central position. Advantageously, each of said openings (70), starting from the lower side (7L) of the bridge, first has a lower width and then a higher width. The centre-to-centre distance (A70) between the two openings (70) is equal to the centre-to-centre distance between the two guides (4) inserted in the bodies (1, 2). In its narrowest part, each opening (70) has a width (L70) smaller than the outer diameter of the guides (4) and greater than the diameter of the grooves (40). In this way, it is possible to position the bridge (7) on the guides (4) more easily but in any case ensuring a fir connection between the guides (4).

Figure 7:
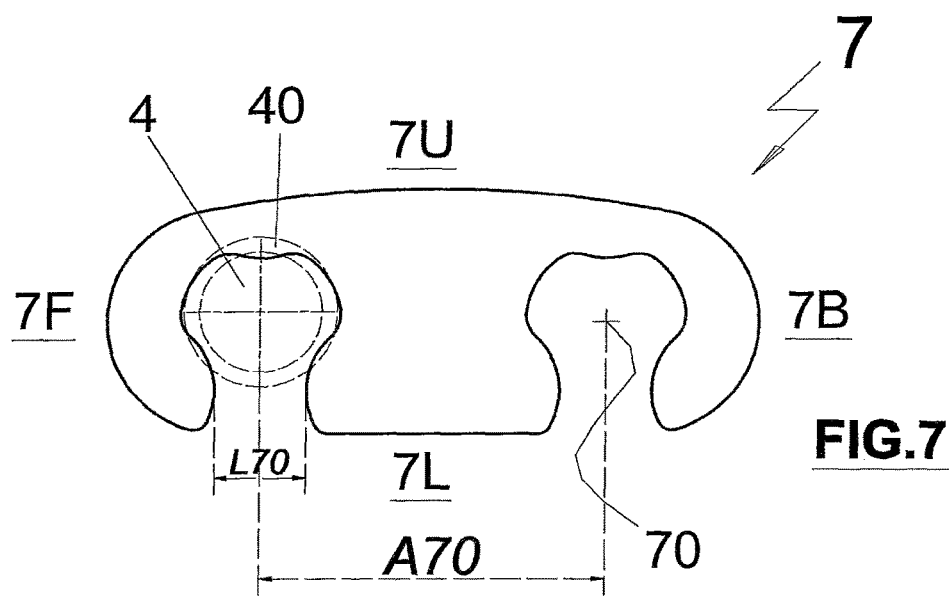
FIG. 7 shows a front view of a bridge connecting the guides according to a possible embodiment.
Figure 8:
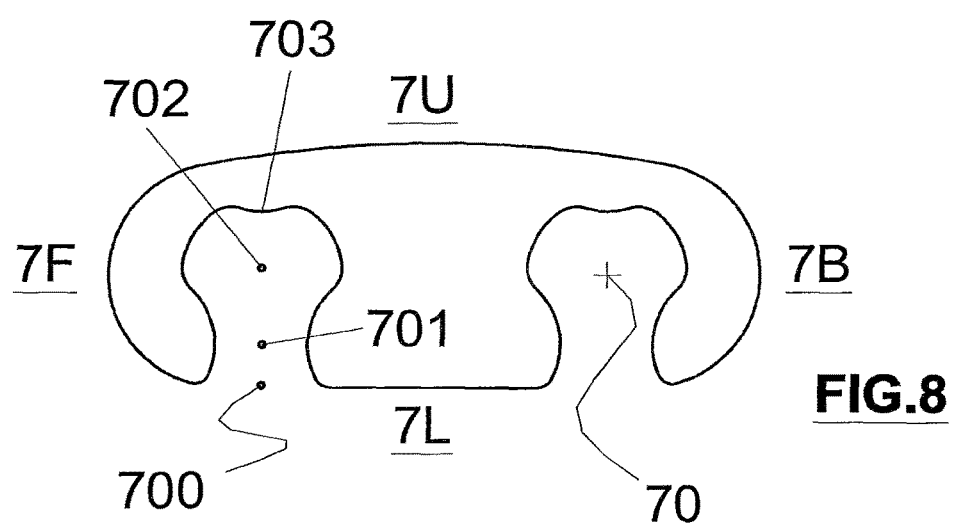
FIG. 8 represents again the bridge of FIG. 7 for an easier identification of its conformation.

In FIG. 7 the bridge (7) is shown applied on a single guide (4) to simplify the drawing. With reference to FIG. 8, each of said openings (70) has, starting front the lower side (7U) of the bridge (7), an entry or insertion section (700), then a nip (701) and then a wider section (702). The latter is wider transversely both with respect to the inlet section (700) and with respect to the intermediate nip (701) and has a convex upper side (703), with the convexity facing the inlet section (700).

As previously said, the bridge (7) is positioned on the grooves (40) of the rods (4). This positioning implies a slight elastic forcing of the openings (70) which, however, also ensures a correct connection between the guides (4) of the expander.

Preferably, the upper side (7U) of the bridge (4) has a rounded edge as well as both the front (7F) and the rear (7B) sides.

Said bridge (7) increases the stability of the expander, linking the guides (4) to each other, which, by virtue of the constraint thus created, are not free to move independently.

In practice, the bridge (7) is a means for preventing the reciprocal movement of the guides (4).

As shown in the drawings, said bridge (7) has a substantially laminar structure, i.e. flattened, developed according to a plane orthogonal to the longitudinal axes (x) of said guides (4).

The shape of the bridge (7) and its arrangement in the expander determine a stable (although removable in the example described above which is particularly advantageous for the assembly of the expander) application of the bridge on the guides (4) preventing their reciprocal movement. In practice, the bridge (7) locks the guides (4) to each other. Seen from above, the group formed by the guides (4) and by the bridge (7) forms a figure in the shape of "H".

The bridge (7) prevents the guides (4) front moving axially independently of one another. Moreover, the bridge (7) increases the resistance to stresses to which the guides (4) are subjected during the use of the expander.

According to the example shown in the drawings, said bridge (7) has a substantially laminar or flattened structure developed according to a plane orthogonal to the longitudinal axes (x) of said guides (4) such that the thickness (t7) of the laminar or flattened structure is parallel to the guides (4).

It is further observed that the laminar shape of the bridge (7) and its orientation with respect to the guides (4) do not significantly impede the positioning of the expander in the configuration of FIG. 1, in which the plates (6) are compressed.

The bridge (7) not only links the two guides (4) to one another but also limits the axial sliding of the guides with respect to the bodies (1, 2) without increasing the overall dimensions of the device and causing discomfort to the patient.

The plates (6) are positioned visibly, in the space between the bodies (1) and (2) of the expander, thus allowing the dentist to be able to easily check the state of compression/expansion.

In the description that precedes the terms "left" and "right" "left body" and "right body" refer to the examples illustrated in the attached drawings, but are not intended to be limiting.

The following description concerns the possible use of an orthodontic expander according to the invention.

The expander is positioned on the patient's upper dental arch in an initial loaded configuration, i.e. with the plates (6) kept compressed by means of a wire loop (not shown in the drawings) which initially connects the left bodies (1) and the right body (2) neutralizing the action of the plates (6). In this configuration, the distance between the bodies (1, 2) has the minimum value (d1) which substantially corresponds to the space occupied by the plates (6) in the compressed configuration and by the bridge (7). After the expander has been positioned on the dental arch, the wire loop is cut and therefore the plates (6) exert, by means of the left and right frames of the expander, the expansive forces respectively on the left and right sides of the expander dental arch. Over time, under the thrust exerted by the plates (6), the dental structures on which the expander is applied expand and therefore the same plates (6) gradually flex until they are unloaded, i.e. they reach the configuration in which they are no longer able to apply any significant deformation force on the upper dental arch. The expander thus goes into a unloaded configuration. In this configuration, the plates (6) assume the unloaded configuration shown in FIG. 2 and the distance between the bodies (1) and (2) assumes the maximum value (d2).

The bridge (7) which directly connects the guides (4) with each other contributes to a greater overall stability of the expander preventing any disjointed movement of the guides inside the holes (10, 20) of said bodies (1, 2). In practice, the bridge (7) constitutes a further constraint for the guides (4), in addition to that constituted by the bodies (1, 2) which constrain the guides in an indirect manner.

On at least one of the bodies (1, 2) an index (21) can be imprinted indicating the value of the maximum expansion (for example 6 mm), i.e. an index correlated to the length of the guides (4).

In practice, the details of execution may in any case vary in an equivalent manner as regards the individual elements described and illustrated, without departing from the scope of the solution idea adopted and therefore remaining within the limits of the protection afforded by the present patent according to the claims.

The invention claimed is:

1. Orthodontic expander comprising:
a left frame and a right frame, wherein said left frame comprises a left body and said right frame comprises a right body, each of the bodies having anchoring means for anchoring them to the teeth of a dental arch, wherein said bodies have through holes oriented in a predetermined expansion direction, wherein said frames are slidably mounted along said expansion direction by means of guides inserted into said holes of the bodies, wherein elastic means are arranged and acting between said frames, wherein the orthodontic expander is a self-activated orthodontic expander and said guides are further constrained with each other by a bridge oriented orthogonally to the same guides and adapted to prevent the reciprocal movement of the guides, wherein the bridge prevents the guides from moving axially independently of one another and said guides are joined together by the bridge.

2. Orthodontic expander according to claim 1, wherein said elastic means comprise multiple plates having an arcuate profile, arranged at both sides of the bridge, and the both sides are the sides of the bridge that are oriented orthogonally to the guides.

3. Orthodontic expander according to claim 2, wherein said plates are connected to said guides.

4. Orthodontic expander according to claim 3, wherein said plates have elliptical holes passed through by said guides.

5. Orthodontic expander according to claim 1, wherein said bridge is made up of a plate which, on its lower side, has two openings through which the bridge is fitted onto the guides.

6. Orthodontic expander according to claim 1, wherein said bridge is constituted by a plate which, on its lower side, has two openings through which the bridge is fitted onto the guides and each guide has an annular groove engaged by the bridge in correspondence at said openings.

7. Orthodontic expander according to claim 1, wherein on an at least one of said bodies a mark is provided which identifies the maximum reachable expansion.

8. Orthodontic expander according to claim 1, wherein the bridge is centered on said guides.

9. Orthodontic expander according to claim 1, wherein said bridge has a flattened structure developed according to a plane orthogonal to the longitudinal axes of said guides such that the thickness of the flattened structure is parallel to the guides.

* * * * *